United States Patent [19]

Halsten

[11] 3,959,954
[45] June 1, 1976

[54] GRASS CUTTING AND PULVERIZING ROTARY MOWER

[76] Inventor: Lawrence E. Halsten, 20165 Cottagewood Ave., Excelsior, Minn. 55331

[22] Filed: Feb. 20, 1975

[21] Appl. No.: 551,082

[52] U.S. Cl. .................................. 56/12.8; 56/12.7; 56/255
[51] Int. Cl.² ......................................... A01D 35/26
[58] Field of Search ................... 56/12.7, 12.9, 13.2, 56/13.3, 13.6, 13.7, 17.5, 503, 255, 295, 12.8

[56] References Cited
UNITED STATES PATENTS

| | | | |
|---|---|---|---|
| 2,585,296 | 2/1952 | Bennett et al. | 56/12.7 |
| 2,659,191 | 11/1953 | Miller et al. | 56/12.9 |
| 2,706,372 | 4/1955 | Blydenburgh | 56/12.9 |
| 2,734,327 | 2/1956 | Whitney | 56/255 |
| 2,983,096 | 5/1961 | Phelps | 56/255 |
| 3,002,331 | 10/1961 | Denney | 56/13.4 |
| 3,049,854 | 8/1962 | Denney | 56/13.4 |
| 3,157,015 | 11/1964 | Russell et al. | 56/12.7 |
| 3,531,923 | 10/1970 | DeLay | 56/17.5 X |

*Primary Examiner*—Russell R. Kinsey
*Attorney, Agent, or Firm*—Leo Gregory

[57] ABSTRACT

This mower consists of a cylindrical housing having a power shaft therein carrying a cutting blade at the lower portion of the housing and having mounted on said shaft above said cutting blade in the upper portion of said housing a plurality of pulverizing members which pulverize the grass, leaves and other material drawn into the housing and the upper portion of said housing has an apertured wall through which said pulverized material is discharged.

5 Claims, 4 Drawing Figures

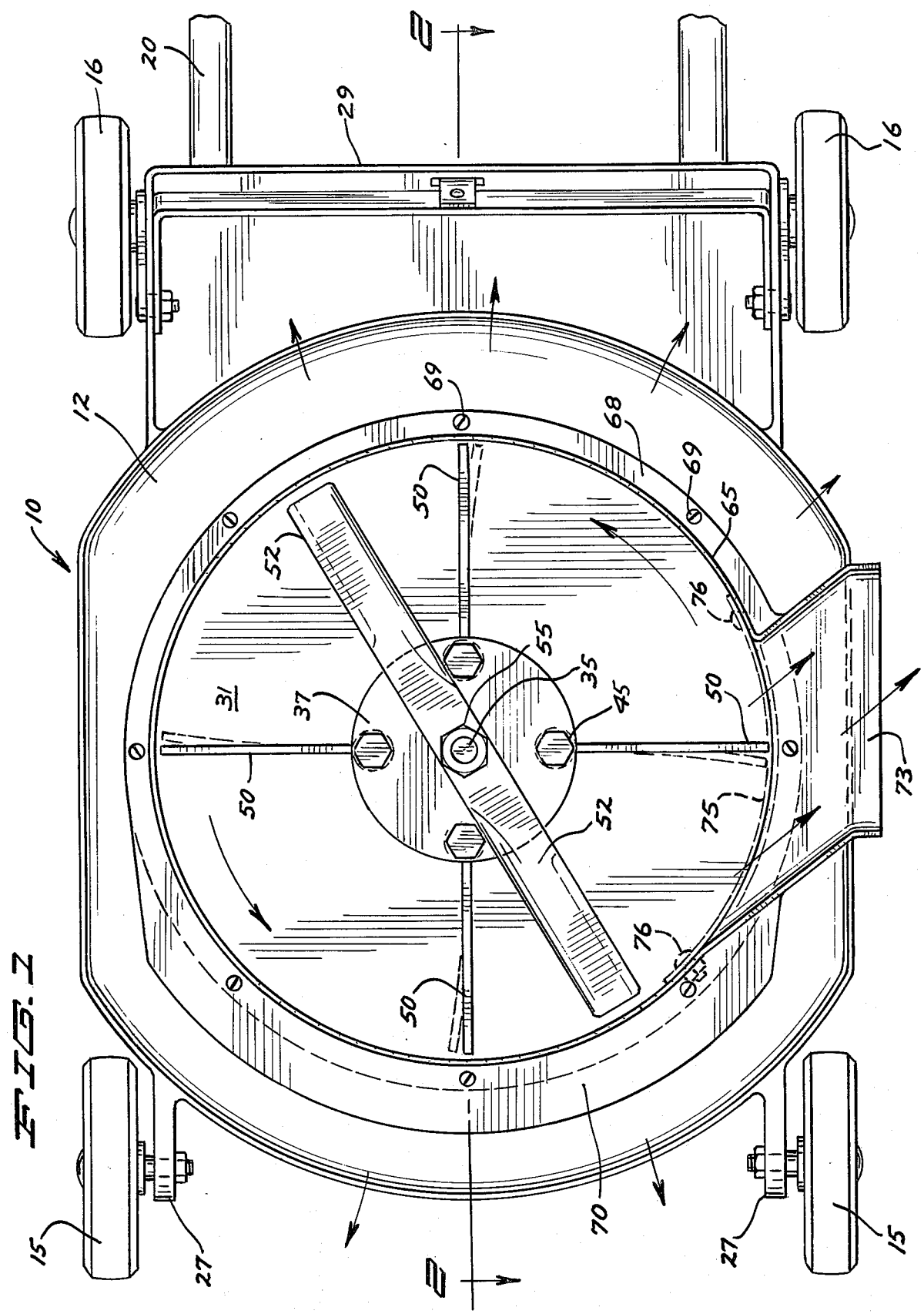

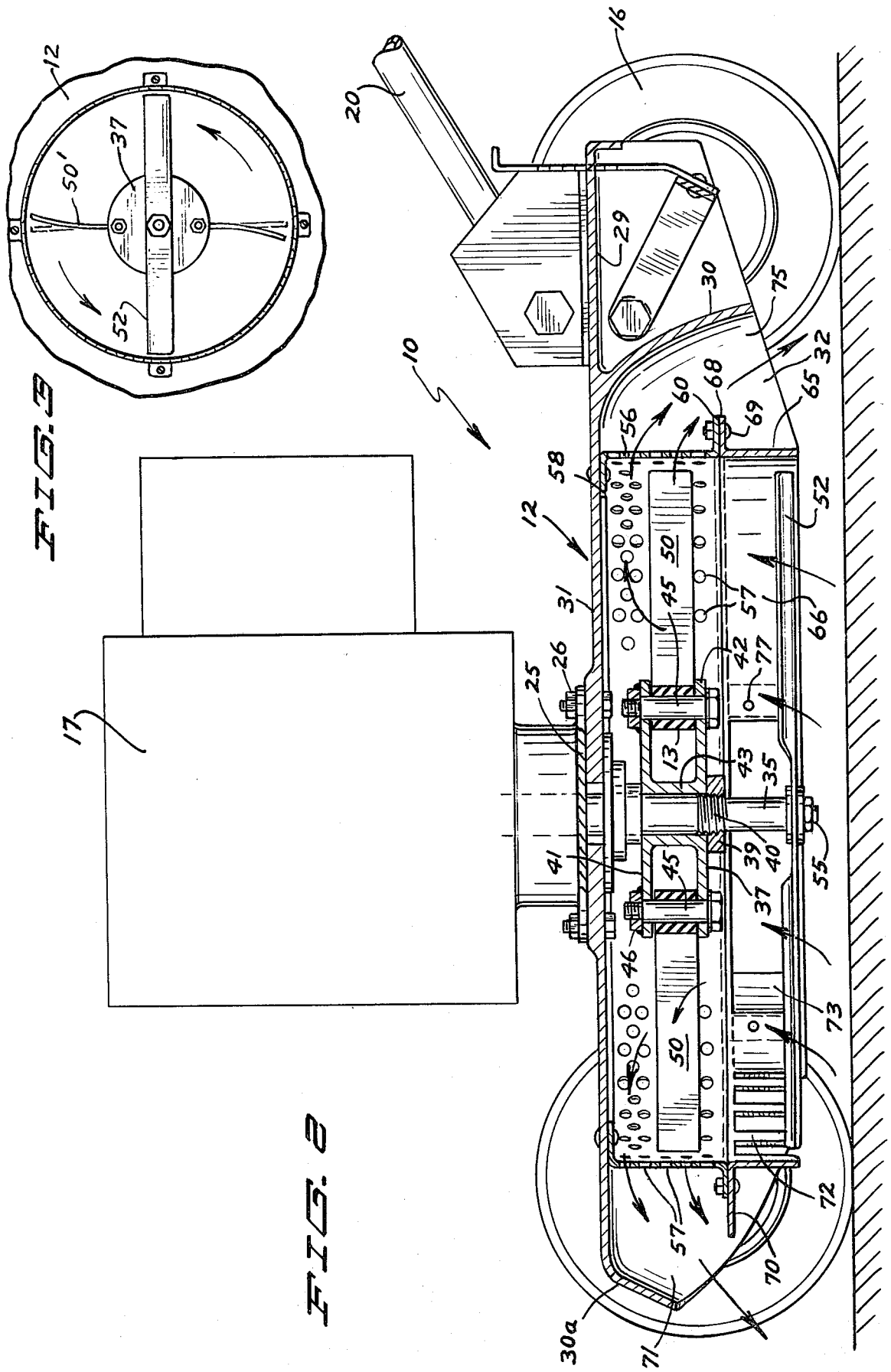

GRASS CUTTING AND PULVERIZING ROTARY MOWER

BACKGROUND AND SUMMARY OF THE INVENTION -

This invention relates to an improvement in a rotary type power lawn mower wherein the improvement consists in having in connection with a grass cutting blade a plurality of pulverizing members such as flails or hammers driven by the drive shaft of the cutting blade to reduce to a small size the grass and other material drawn into the mower housing and initially cut by said cutting blade and discharging the pulverized material through an apertured screen forming an upper portion of the mower housing surrounding the pulverizing members, said pulverized grass and other material forming a mulch for the cut area. Power mower as used hereinafter relates to a rotary type of power mower used for cutting grass.

A conventional power mower is particularly adapted to cut grass and to discharge the cuttings through a chute. The housings of such mowers are generally equipped for the attachment of an apertured plate member over the opening in the housing leading to the discharge chute for the purpose of having the blade grind up or pulverize the cuttings. In practice, it has been found that a power mower with such an arrangement tends to become filled up and clogged with cuttings and that discharge of such material through an apertured plate member is ineffective. The tendency to clog is aggravated by the presence of moisture in the cuttings. An attempt to cut up leaves and sticks in the fall of the year in cleaning up a lawn also results in a clogging up of the mower housing.

It has been found that by increasing the height of the mower housing and by installing therein a plurality of pulverizing members in the form of flails or hammers at the upper portion of the drive shaft which carries the cutting blade, that grass, leaves and other material drawn into the housing by the action of the cutting blade is reduced by the action of the pulverizing members to such small size that it is all readily discharged through an apertured plate member which forms the upper wall portion of the mower housing about said pulverizing blades.

It is an object of this invention therefore to provide a power mower on the order of a conventional type of such a mower which embodies for operation in conjunction with the grass cutting blade pulverizing means carried by the drive shaft of said cutting blade to effectively pulverize the grass, leaves and other materials drawn into the housing and initially cut by the cutting blade.

It is another object of this invention to provide a pulverizing attachment for use in connection with a power mower which may be readily detached and removed from the mower.

It is also an object of this invention to provide a pulverizing attachment for use in connection with a power mower which effectively pulverizes leaves, sticks, stubble and other material in addition to grass cuttings.

It is more specifically an object of this invention to provide a power mower comprising a housing having a drive shaft therein carrying a cutting blade at its lower end portion and having a plurality of pulverizing members carried thereon spaced upwardly of said cutting blade and said housing having an apertured wall portion about said pulverizing flails for the discharge of pulverized material.

These and other objects and advantages of the invention will be set forth in the following description made in connection with the accompanying drawings in which like reference characters refer to similar parts throughout the several views and in which:

FIG. 1 is a bottom plan view;

FIG. 2 is a view in vertical cross section taken on line 2—2 of FIG. 1 as indicated with a portion thereof being diagrammatic and a portion thereof being broken away;

FIG. 3 is a broken view in section on a reduced scale showing a modification of a detail of structure.

DESCRIPTION OF A PREFERRED EMBODIMENT -

Figure 4:
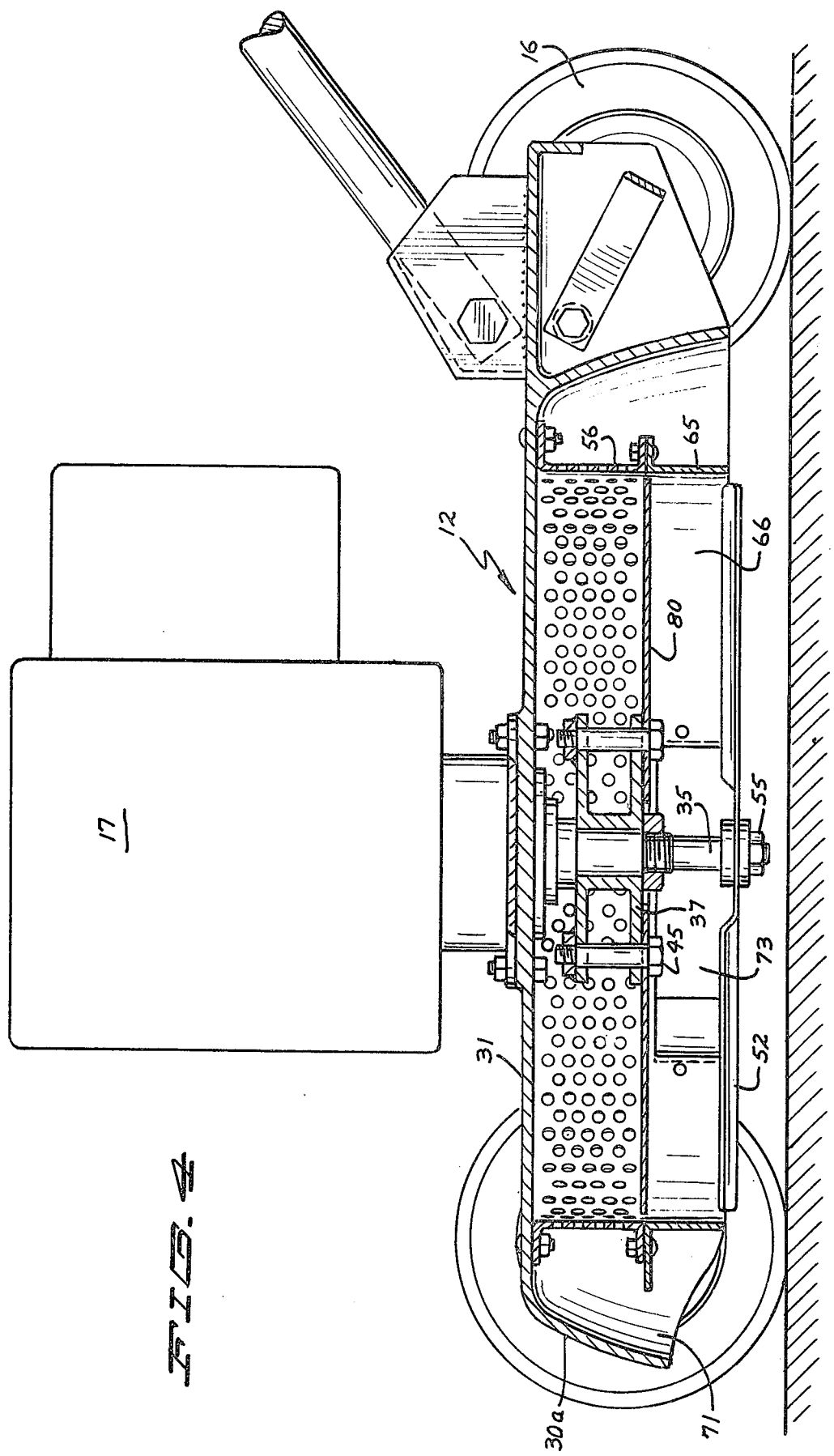
FIG. 4 is a view similar to FIG. 2 showing a modification.

With reference to FIGS. 1 and 2, the apparatus herein comprising a rotary type of grass cutting and pulverizing mower is indicated generally by the reference numeral 10 and consists of a housing 12 supported by wheels 15 mounted thereon in a conventional manner as known in the art and seated thereupon is a conventional type of internal combustion engine 17 such as is commonly used for such a mower and which is here merely schematically indicated. Said apparatus will be operated by a handle 20 shown here in broken view and carried by said handle accessible to the operator will be conventional control members for operating the mower, all of which is known in the art and which is not a part of the invention herein and which is not here shown.

Said engine 17 is shown supported on the housing 12 by a mounting plate 25 which is secured by a plurality of bolts 26. Said housing is substantially cylindrical in form having projecting frame portions 27 extending forwardly thereof to carry the front wheels 15 and having a substantially rectangular frame portion 29 extending rearwardly thereof to carry the rear wheels 16 and to have the handles 20 connected thereto.

Said housing 12 comprises an upper plate portion 31 having an annular downwardly curved wall portion 30 depending therefrom and extending substantially thereabout forming a chamber 32 therein.

Extending downwardly from said engine 17 in driving connection therewith is a drive shaft 35. Mounted onto the upper portion of said drive shaft is a hub 37 held in place by a lock nut 39 with said shaft being threaded to receive said lock nut as at 40. Said hub portion is here shown to be circular in form as in FIG. 1 and comprises a pair of vertically space plate members 41 and 42 connected by a web 43 therebetween and having spaced thereabout a plurality of vertically disposed headed bolts 45 secured by nuts 46. Each of said bolts forms a shaft having journalled thereon a pulverizing member 50 here shown in the form of a flail or hammer. In the present embodiment there are shown to be four pulverizing members which will swing freely as mounted on their respective bolts or shafts 45 and will be driven by said drive shaft 35. Said pulverizing members may be variously made and in the present embodiment they are indicated as being made of such material as to have toughness against breaking or cracking in engaging hard objects in a whipping action which has proved to be very effective in pulverizing grass, leaves, sticks and other material. Mounted at the lower end of said shaft is a conventional type of grass cutting blade 52 secured by a lock nut 55.

Depending from said plate member 31 is cylindrical wall 56 formed here of a plate member having a multiplicity of apertures 57 therein with said wall having a diameter such as to accommodate therein said pulverizing members 50. Said wall member 56 as here illustrated is suitably secured to said upper plate member 31 as by having its upper right-angled annular flange 58 welded or otherwise secured thereto. Said wall member 56 extends downwardly to a point somewhat below the level of said pulverizing members 50 and is shown here having an annular outward flange 60 about its lower end portion. A second cylindrical wall member 65 having an imperforate wall structure depends from said first wall member 56 and has an annular flange 68 mating with said flange 60 to be secured thereto as by bolts 69. It is noted that said wall members 56 and 65 may be formed of a single plate member. Said flange 68 has a forwardly projecting portion 70 to form a forward discharge chute portion 71 in cooperation with an adjacent upper forwardly projecting portion 30a of said outer wall 30.

The downwardly curved wall 30 and its forward portion 30a form a deflection plate and define a discharge chute completely about the perforate wall member 56.

Formed within said walls 56 and 65 is a chamber 66 within which the cutting blade 52 and pulverizing members 50 operate.

A forward portion 72 of said wall member 65 is in the form of spaced depending tooth members as shown. A discharge port 73 is also formed in said wall member 65 as shown in FIG. 1 and the same may be covered over by a plate member 75 at the inner side of the wall 65 suitably secured as by bolts 76 disposed through holes 77 as shown in FIG. 1.

With reference to FIG. 3, a modification is shown in which only two opposed pulverizing members 50' are indicated, said members being the same as the members 50.

With reference to FIG. 4, a modification of the structure first above described is shown in which the modification consists of removing the pulverizing members 50 and underlying the upper portion of the chamber 66 with a circular plate member 80 which is secured to the bottom of the hub 37 by the bolts 45. The remainder of this structure is as first above described and like parts are indicated by like reference numerals.

OPERATION -

As in the operation of any commonly used type of rotary power mower, the cutting blade 52 creates a vacuum or suction effect with respect to the chamber 66 in lifting grass to cut the same and in drawing leaves and other material into said chamber. The pulverizing members 50 also create a like suction effect in drawing material from the lower to the upper portion of the chamber 66 to pulverize the material thus drawn up and further create a cyclonic condition in discharging pulverized material outwardly through the apertures 57 about said wall 56 and also forwardly thereof the discharge chute 71 formed as a forward projection of the wall 56 at a level above that of the forward portion of the wall 65 permits a discharge of material therethrough but more important at this point, the air passing out of the chute 71 is in a toroidal effect drawn into the lower portion of the chamber 66 assisting material to be drawn into said chamber through the tooth members 72 forming an intake portion by action of the blade 52. This avoids the tendency for leaves and other loose material from being blown away from the front of the mower by the discharge of pulverized material from the upper portion of chamber 66.

The blades 50 in swinging freely have a very effective cutting or pulverizing action in reducing grass, leaves, sticks, stubble growth and the like to such a small size as to form a very desirable mulch and the material thus pulverized is readily discharged through said apertures 57. Dry leaves have been reduced to an almost powdery substance. This action has proved very effective also in pulverizing wet material and in very effectively discharging such material through said apertures. Wet materials has been found to clog up a mower not embodying the invention herein.

The operation of cleaning up a lawn of leaves and sticks and other material as well as of cutting grass is carried out in the fall of the year just prior to winter setting in and is also carried out in the first cuttings of the spring to clean up a lawn.

Presently known types of power mowers in attempting to achieve a pulverizing action by regrinding material within the housing chamber are provided with a perforate plate to overlie a discharge chute on the basis that material within the housing will be ground up and reground sufficiently to be discharged through the apertures in said plate. This type of pulverizing action is not successfully carried out with known type of mowers. The housing chamber is readily clogged up with both grass and leaves and particularly if there is any dampness present in the material. If the leaves are dry, they are readily broken up but the cutting blade does not have sufficient action to discharge the same and the broken or cut up leaves literally clog up the chamber and bridge over the apertured discharge plate.

The disadvantage of clogging has been entirely eliminated in the construction of the applicant's apparatus and it has proved to be very successful in performance.

The pulverizing blades 50 do not interfere with normal grass cutting; to the contrary, as above described, they will very nicely pulverize grass cuttings and reduce the same to a desirable mulch. Said pulverizing blades may be readily removed if desired as indicated in FIG. 4 and the applicant's structure may then be used in the same manner as the ordinary type of rotary power mower.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A pulverizing attachment for a rotary power mower, having in combination a mower housing having a chamber therein, power means carried by said housing, a drive shaft from said power means disposed in said chamber, a cutting blade mounted on said drive shaft adjacent the lower end portion thereof in the lower portion of said chamber, a pulverizing member mounted on said drive shaft spaced upwardly of said cutting blade within the upper portion of said chamber, the upper portion of said housing comprising a vertically disposed apertured plate member about said pulverizing member at the upper portion of said chamber, and the lower portion of said housing comprising a vertically disposed imperforate plate member about said cutting blade within the lower portion of said housing.

2. The structure set forth in claim 1, including
means carried by said drive shaft having said pulverizing member journalled thereon for free horizontal swinging movement.

3. The structure set forth in claim 1, wherein
a stationary plate member underlying said upper portion of said housing to reduce the height of said mower housing to just accommodate said cutting blade for cutting grass, and
means in connection with said housing securing said plate member.

4. The structure set forth in claim 1, including
a deflection plate member disposed about said apertured plate member.

5. The structure set forth in claim 1, including
a deflection plate member disposed about said apertured plate member,
a forward portion of said deflection plate member and a projecting flange downwardly spaced therefrom forming a forwardly projecting chute portion of said apertured plate member,
a toothed portion forming a portion of said lower wall portion of said housing forming an intake portion underlying said forward projecting chute,
whereby the air discharge from said chute by a toroidal effect assists the intake of material through said toothed portion into engagement with said cutting blade in said mower housing.

* * * * *